Dec. 4, 1962
J. W. TUMAVICUS
3,066,702
COOLED NOZZLE STRUCTURE
Filed May 28, 1959
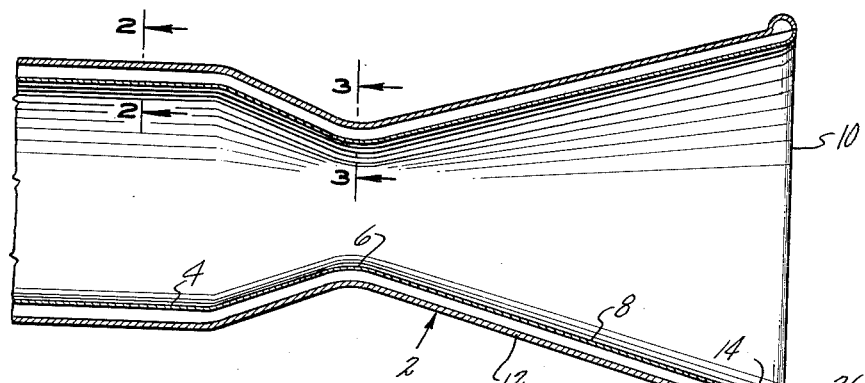
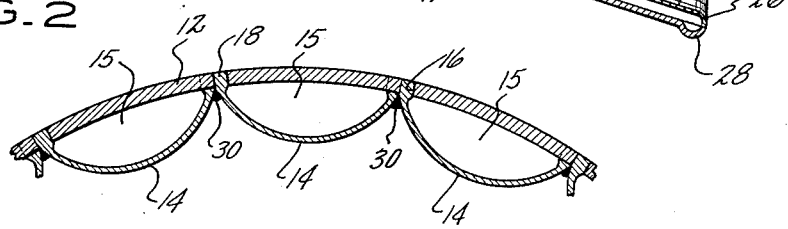
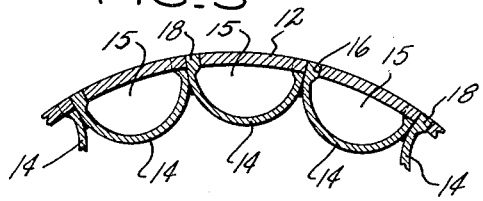
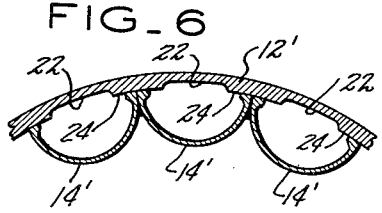
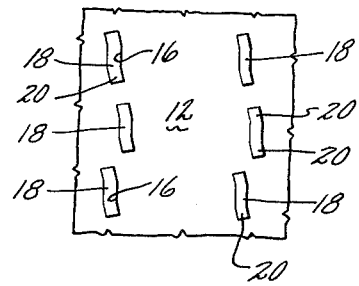
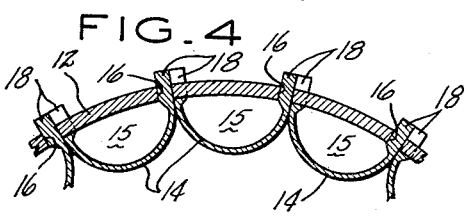
INVENTOR
JULIUS W. TUMAVICUS
BY Charles A. Warren
ATTORNEY

United States Patent Office 3,066,702
Patented Dec. 4, 1962

3,066,702
COOLED NOZZLE STRUCTURE
Julius W. Tumavicus, Indiantown, Conn., assignor to United Aircraft Corporation, East Hartford, Conn., a corporation of Delaware
Filed May 28, 1959, Ser. No. 816,643
3 Claims. (Cl. 138—111)

This invention relates to a wall construction particularly adapted for use in a rocket nozzle.

One feature of the invention is an easily fabricated double-walled structure for use in a nozzle including a main shell with liner elements secured to the inner wall thereof in such a way as to form distinct passages for a coolant. Another feature is the arrangement of the liner elements in such a way as to define coolant passages in a preselected pattern and with the appropriate area to assure the desired quantity of flow in various selected portions of the nozzle.

One feature of the invention is the method for making a cooled wall construction including the attachment of liner elements of substantially U-shaped or arched cross section to the main wall structure with the ends of the U-shaped section or of the arch secured to the main wall and in contact with adjacent elements.

Prior to this invention, the coolant passages in a rocket chamber or nozzle have been formed by tubes, many of which have been tapered in order to accommodate the variations in dimension and the cooling resulting from the tubes has been limited by the available diameter of the tubes. One feature of this invention is a cooled wall construction having coolant passages, the shape and cross-sectional area of which may be adjusted to provide for the most effective coolant flow in all areas.

Other features and advantages will be apparent from the specification and claims, and from the accompanying drawing which illustrates an embodiment of the invention.

FIG. 1 is a longitudinal sectional view through the nozzle.

FIG. 2 is a fragmentary transverse sectional view substantially along the line 2—2 of FIG. 1.

FIG. 3 is a view similar to FIG. 2 along the line 3—3 of FIG. 1.

FIG. 4 is a sectional view similar to FIG. 3 showing a step in the assembly of the nozzle.

FIG. 5 is a plan view of a fragment of FIG. 4.

FIG. 6 is a sectional view similar to FIG. 3 showing a modification.

The invention is shown in a double-thickness cooled wall construction for a combustion chamber or a thrust nozzle 2 especially adapted for use in a rocket. The nozzle has an inlet portion 4 forming an extension of the combustion chamber, a minimum area convergent-divergent throat 6 and a divergent portion 8 terminating in the trailing edge 10 of the nozzle wall. The wall is made up of an outer thin-walled sleeve 12, FIG. 2, which is shaped to approximately the contour desired for the nozzle. This sleeve is preferably made up of sheet metal shaped, as shown.

The liner for the nozzle is formed of a plurality of U-shaped or semitubular elements 14, the free edges of which are in engagement with the outer wall 12 and are brazed or otherwise securely attached thereto and preferably to each other also. Although these elements 14 may be of uniform thickness, they are preferably thin walled except at their outer or free edges to provide a broader contact area with the outer wall. These elements 14 may be readily inspected for dimensional accuracy and for leakage before assembly with the wall 12.

Although these elements 14 may extend in any desired direction, they are preferably arranged longitudinally of the nozzle and the shape of each element is so adjusted that each element will occupy the same sector of the nozzle wall throughout its length. With the liner elements each being separately machined and shaped, it will be apparent that the overall width of each element may vary from end-to-end and, accordingly, the resulting flow passage 15 defined between each element and the outer wall 12 may vary from end-to-end in any preselected pattern.

The several elements 14, by being attached at their opposite free edges to the outer wall 12, define independent flow paths for coolant and these paths, as shown, extend axially of the nozzle. The adjacent elements 14 will be in contact throughout their length and for additional rigidity and for greater assurance against leakage may be brazed or welded together.

One method by which the elements 14 may be attached to the outer shell or wall 12 is by providing slots 16 in the outer wall 12 through which projecting tabs 18 on the elements 14 may extend, the outer ends 20 of these tabs being twisted to retain the elements in position. These tabs may be left on in the finished construction or, if desired, after the elements 14 are securely brazed to the wall 12, the projecting end portions 20 of the tabs may be machined off to provide a smooth outer wall, as in FIGS. 2 and 3. These tabs are preferably staggered, as shown, to improve the attachment to the outer wall.

In addition to controlling the passage area in the spaces formed between the independent elements and the outer wall the latter may also be grooved between the elements. As shown in FIG. 6, the outer wall 12' may have grooves 22 formed on its inner surface between the lands 24 to which the elements 14' are attached. These grooves 22 will reduce the total weight of the nozzle without reducing the thickness where it is needed for attachment of the elements 14 or 14' and may also increase the flow area without any additional constriction of the nozzle area.

At their downstream ends the elements 14 may be formed to provide an end wall 26 fo reach element, this end wall terminating beyond the outer wall 12 and being attached to a surrounding manifold 28 as by brazing. The brazing 30 between adjacent elements 14 will eliminate leakage at this point.

It is to be understood that the invention is not limited to the specific embodiment herein illustrated and described, but may be used in other ways without departure from its spirit as defined by the following claims.

I claim:

1. A rocket nozzle construction of generally circular cross-section and concentric about an axis and including a sleeve contoured from end-to-end to define a minimum area convergent-divergent throat positioned between regions of larger diameter, and similarly shaped liner elements substantially U-shaped in cross section extending axially of and lining the sleeve with each liner element occupying the same sector of said sleeve throughout its length, the latter having openings therein and the opposite edges of the liner elements having tabs thereon projecting through the sleeve openings for holding the elements against the sleeve, adjacent liner elements being in sidewise contact with one another.

2. A cooled double-walled rocket nozzle construction including an outer thin walled element of generally circular cross-section and concentric about an axis and contoured to define a minimum area convergent-divergent throat positioned between regions of larger diameter and liner elements arched in cross section covering the inner side of said rocket nozzle wall, said liner elements extending axially of the outer element and each liner element being of thin walled construction with continuous increased wall thickness along the opposite edges, said opposite edges of the liner elements being attached throughout their lengths to the sleeve to form individual coolant passages and the adjacent liner elements being in sidewise contact with one another such that the entire surface of the outer element is covered by the liner elements with each liner element occupying the same sector of said outer thin walled element throughout its length the outer wall element having aligned openings therein and each of the liner elements having tabs thereon extending through the openings for attachment of the liner element to the wall with said liner elements extending beyond said wall to form an overlapping section, and conduit means joining said liner elements and said wall to form a propellant manifold therewith.

3. A construction as in claim 2 in which the outer wall element is grooved between the lines of attachment of the liner elements thereto to increase the area of the coolant passages defined by the liner elements.

References Cited in the file of this patent

UNITED STATES PATENTS

| | | |
|---|---|---|
| 1,057,098 | Smith | Mar. 25, 1913 |
| 2,215,318 | Bristol | Sept. 17, 1940 |
| 2,420,715 | Millward | May 20, 1947 |
| 2,631,557 | Larkin | Mar. 17, 1953 |
| 2,772,860 | Nelson | Dec. 4, 1956 |
| 2,880,577 | Halford et al. | Apr. 7, 1959 |
| 2,958,183 | Singelmann | Nov. 1, 1960 |
| 2,968,918 | Denison | Jan. 24, 1961 |

FOREIGN PATENTS

| | | |
|---|---|---|
| 876,988 | France | Aug. 24, 1942 |